(12) United States Patent
Simmons et al.

(10) Patent No.: US 10,846,298 B2
(45) Date of Patent: Nov. 24, 2020

(54) RECORD PROFILING FOR DATASET SAMPLING

(71) Applicant: Microsoft Technology Licensing, LLC, Redmond, WA (US)

(72) Inventors: Daniel G. Simmons, Sammamish, WA (US); Kevin David James Grealish, Seattle, WA (US); Sumit Gulwani, Sammamish, WA (US); Ranvijay Kumar, Sammamish, WA (US); Kevin Michael Ellis, Cambridge, MA (US); Saswat Padhi, Los Angeles, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 596 days.

(21) Appl. No.: 15/338,161

(22) Filed: Oct. 28, 2016

(65) Prior Publication Data

US 2018/0121525 A1 May 3, 2018

(51) Int. Cl.
*G06F 7/00* (2006.01)
*G06F 16/25* (2019.01)
*G06F 16/28* (2019.01)

(52) U.S. Cl.
CPC .......... *G06F 16/258* (2019.01); *G06F 16/285* (2019.01)

(58) Field of Classification Search
CPC .... G06F 16/258; G06F 16/285; G06F 16/278; G06F 16/284; G06F 16/27; G06F 16/273;
(Continued)

(56) References Cited

U.S. PATENT DOCUMENTS

| 5,504,848 A | 4/1996 | Yamada et al. |
| 5,790,760 A | 8/1998 | Arima |

(Continued)

FOREIGN PATENT DOCUMENTS

| CN | 1400547 A | 3/2003 |
| CN | 101639861 A | 2/2010 |

(Continued)

OTHER PUBLICATIONS

Mitchell, T., "Generalization as Search," Artificial Intelligence, vol. 18, No. 2, Mar. 1982, 24 pages.
(Continued)

*Primary Examiner* — Azam M Cheema
(74) *Attorney, Agent, or Firm* — Alleman Hall Creasman & Tuttle LLP (57) ABSTRACT

A method for generating a smaller dataset from a larger dataset, each dataset holding a plurality of records, includes profiling the larger dataset to identify a plurality of patterns, each of which is descriptive of one or more records held in the larger dataset. A plurality of slots of the smaller dataset is filled with records held in the larger dataset. Multiple records held in the larger dataset are individually retrieved, and for each retrieved record it is determined whether to place the retrieved record into a slot of the smaller dataset and evict a record already occupying that slot, or not place the retrieved record into the smaller dataset. This determination is based on a pattern of the retrieved record and a representation status of the pattern in the smaller dataset.

20 Claims, 8 Drawing Sheets

(58) Field of Classification Search
CPC ........... G06F 16/275; Y10S 707/99936; Y10S 707/99941; Y10S 707/966; Y10S 707/968
See application file for complete search history.

(56) References Cited

U.S. PATENT DOCUMENTS

| | | | |
|---|---|---|---|
| 5,920,717 A | 7/1999 | Noda | |
| 6,035,302 A | 3/2000 | Tonouchi | |
| 6,327,699 B1 | 12/2001 | Larus et al. | |
| 6,484,310 B1 | 11/2002 | Przybylski et al. | |
| 6,882,999 B2 | 4/2005 | Cohen et al. | |
| 6,963,871 B1 | 11/2005 | Hermansen et al. | |
| 7,010,779 B2 | 3/2006 | Rubin et al. | |
| 7,155,683 B1 | 12/2006 | Williams | |
| 7,165,019 B1 | 1/2007 | Lee et al. | |
| 7,254,569 B2 | 8/2007 | Goodman et al. | |
| 7,376,937 B1 | 5/2008 | Srivastava et al. | |
| 7,433,885 B2 | 10/2008 | Jones | |
| 7,546,541 B2 | 6/2009 | Hori et al. | |
| 7,676,444 B1 | 3/2010 | Venkatachary et al. | |
| 7,979,268 B2 | 7/2011 | Lee | |
| 8,065,336 B2 | 11/2011 | Armstrong et al. | |
| 8,175,875 B1 | 5/2012 | Dean et al. | |
| 8,332,383 B2 | 12/2012 | Posner et al. | |
| 8,484,230 B2 | 7/2013 | Harnett et al. | |
| 8,589,874 B2 | 11/2013 | Ralls et al. | |
| 8,600,916 B2 | 12/2013 | Chen et al. | |
| 8,601,019 B1 | 12/2013 | Weininger et al. | |
| 8,650,207 B2 | 2/2014 | Gulwani et al. | |
| 8,655,775 B1 * | 2/2014 | Howe | G06Q 20/26 705/39 |
| 8,694,483 B2 | 4/2014 | Roulland et al. | |
| 8,694,883 B2 | 4/2014 | Matsumoto | |
| 8,799,234 B2 | 8/2014 | Gulwani et al. | |
| 8,850,263 B1 | 9/2014 | Yourtee et al. | |
| 8,850,310 B2 | 9/2014 | Rampson et al. | |
| 8,972,930 B2 | 3/2015 | Gulwani | |
| 9,002,758 B2 | 4/2015 | Gulwani et al. | |
| 9,031,955 B2 | 5/2015 | Carasso et al. | |
| 9,311,289 B1 | 4/2016 | Kaptur et al. | |
| 2002/0069220 A1 | 6/2002 | Tran | |
| 2003/0004874 A1 | 1/2003 | Ludwig et al. | |
| 2003/0154187 A1 * | 8/2003 | Hayakawa | G06F 16/273 |
| 2004/0158810 A1 | 8/2004 | Dove et al. | |
| 2004/0243618 A1 * | 12/2004 | Malaney | G06F 16/22 |
| 2005/0080755 A1 | 4/2005 | Aoyama | |
| 2005/0149536 A1 | 7/2005 | Wildes et al. | |
| 2005/0182629 A1 | 8/2005 | Coorman et al. | |
| 2005/0228640 A1 | 10/2005 | Aue et al. | |
| 2005/0246681 A1 | 11/2005 | Little et al. | |
| 2006/0161844 A1 | 7/2006 | Simkhay et al. | |
| 2006/0206507 A1 * | 9/2006 | Dahbour | G06F 16/288 |
| 2007/0050700 A1 | 3/2007 | Simkhay et al. | |
| 2007/0055493 A1 | 3/2007 | Lee | |
| 2007/0078872 A1 | 4/2007 | Cohen | |
| 2007/0244694 A1 | 10/2007 | Hosokawa | |
| 2007/0250765 A1 | 10/2007 | Chen et al. | |
| 2008/0282108 A1 | 11/2008 | Jojic et al. | |
| 2009/0049354 A1 | 2/2009 | Buckley, Jr. | |
| 2009/0077542 A1 | 3/2009 | Chou et al. | |
| 2009/0106710 A1 | 4/2009 | Teig et al. | |
| 2009/0110282 A1 | 4/2009 | Tanaka et al. | |
| 2009/0119307 A1 | 5/2009 | Braun et al. | |
| 2009/0119416 A1 | 5/2009 | Sirdevan et al. | |
| 2009/0119584 A1 | 5/2009 | Herbst | |
| 2009/0132477 A1 | 5/2009 | Zuev et al. | |
| 2009/0210418 A1 | 8/2009 | Arasu et al. | |
| 2009/0226081 A1 | 9/2009 | Zhou et al. | |
| 2009/0288065 A1 | 11/2009 | Nathan et al. | |
| 2009/0300326 A1 | 12/2009 | Sweeney | |
| 2009/0327888 A1 | 12/2009 | Woolf et al. | |
| 2010/0037127 A1 | 2/2010 | Tomasic et al. | |
| 2010/0083092 A1 | 4/2010 | Schuller et al. | |
| 2010/0125828 A1 | 5/2010 | Vasista | |
| 2010/0146254 A1 | 6/2010 | Park et al. | |
| 2010/0250563 A1 | 9/2010 | Cao et al. | |
| 2010/0312549 A1 | 12/2010 | Akuwudike | |
| 2011/0038531 A1 | 2/2011 | Arasu et al. | |
| 2011/0119284 A1 | 5/2011 | Viswanathan et al. | |
| 2012/0011084 A1 | 1/2012 | Gulwani et al. | |
| 2012/0011152 A1 | 1/2012 | Gulwani et al. | |
| 2012/0192051 A1 | 7/2012 | Rothschiller et al. | |
| 2012/0197887 A1 | 8/2012 | Anderson | |
| 2013/0132410 A1 | 5/2013 | Rineer | |
| 2013/0191714 A1 | 7/2013 | Rothschiller et al. | |
| 2013/0226945 A1 | 8/2013 | Swinson et al. | |
| 2013/0326475 A1 | 12/2013 | Gulwani et al. | |
| 2013/0346982 A1 | 12/2013 | Kalai et al. | |
| 2014/0059078 A1 | 2/2014 | Gulwani et al. | |
| 2014/0195884 A1 | 7/2014 | Castelli et al. | |
| 2014/0324583 A1 | 10/2014 | Chen et al. | |
| 2014/0372854 A1 | 12/2014 | Otero et al. | |
| 2014/0372857 A1 | 12/2014 | Otero et al. | |
| 2015/0169530 A1 | 6/2015 | Otero et al. | |
| 2015/0220605 A1 | 8/2015 | Syed et al. | |
| 2015/0254530 A1 | 9/2015 | Gulwani et al. | |
| 2016/0055157 A1 | 2/2016 | Morimoto et al. | |
| 2016/0224621 A1 | 8/2016 | Bousquet et al. | |
| 2017/0024424 A1 | 1/2017 | Almohizea | |
| 2017/0060367 A1 | 3/2017 | Berlingerio et al. | |
| 2017/0090893 A1 | 3/2017 | Aditya et al. | |
| 2017/0315683 A1 | 11/2017 | Boucher et al. | |
| 2018/0113873 A1 | 4/2018 | Gulwani et al. | |
| 2018/0113922 A1 | 4/2018 | Gulwani et al. | |

FOREIGN PATENT DOCUMENTS

| | | | | |
|---|---|---|---|---|
| EP | 2506155 A1 | | 10/2012 | |
| WO | WO-9835306 A1 * | | 8/1998 | ......... G06F 11/1451 |
| WO | 2010088523 A1 | | 8/2010 | |

OTHER PUBLICATIONS

Nix, R., "Editing by Example," ACM Transactions on Programming Languages and Systems, vol. 7, No. 4, Oct. 1985, 22 pages.

Angluin, D., "Learning Regular Sets from Queries and Counterexamples," Information and Computation, vol. 75, No. 2, Nov. 1, 1987, 20 pages.

Richardson, D. et al., "Approaches to Specification-Based Testing," Proceedings of the Third ACM SIGSOFT Symposium on Software Testing, Analysis, and Verification (TAV3), Dec. 13, 1989, Key West, Florida, 11 pages.

Cypher, A., "EAGER: Programming Repetitive Tasks by Example," Proceedings of the SIGCHI Conference on Human Factors in Computing Systems (CHI '91), Apr. 28, 1991, New Orleans, Louisiana, 9 pages.

Vilar, J., "Query Learning of Subsequential Transducers," Proceedings of the 3rd International Colloquium on Grammatical Inference: Learning Syntax from Sentances (ICG! '96), Sep. 25, 1996, Montpellier, France, 12 pages.

Chattratichat, J. et al., "A Visual Language for Internet-based Data Mining and Data Visualization," Proceedings of the 1999 IEEE Symposium on Visual Languages, Sep. 13, 1999, Tokyo, Japan, 8 pages.

Schrodl, S. et al., "Inferring Flow of Control in Program Synthesis by Example," Proceedings of the 23rd Annual German Conference on Artificial Intelligence: Advances in Artificial Intelligence (KI '99), Sep. 13, 1999, 12 pages.

Lau, T. et al., "Version Space Algebra and its Application to Programming by Demonstration," Proceedings of the Seventeenth International Conference on Machine Learning (ICML '00), Jun. 29, 2000, Stanford, California, 8 pages.

Witten, I. et al., "Chapter 8—TELS: Learning Text Editing Tasks from Examples," Allen Cypher Website, Available Online at http://acypher.com/wwid/Chapters/08TELS.html, Available as Early as Dec. 7, 2000, Retrieved Jun. 13, 2012, 17 pages.

Lau, T. et al., "Learning Repetitive Text-editing Procedures with SMARTedit," in Book "Your Wish is My Command Programming by Example," Morgan Kaufmann Publishers Inc., Mar. 1, 2001, San Francisco, California, 14 pages.

(56) References Cited

OTHER PUBLICATIONS

Miller, R. et al., "Interactive Simultaneous Editing of Multiple Text Regions," Proceedings of the General Track : 2001 USENIX Annual Technical Conference, Jun. 25, 2001, Boston, Massachusetts, 16 pages.
Matskin, M. et al., "Value-Added Web Service Composition Using Automatic Program Synthesis," Proceedings of the Revised Papers from the International Workshop on Web Services, E-Business, and the Semantic Web (CAiSE '02/ WES '02), LNCS 2512, May 27, 2002, Toronto, Ontario, 12 pages.
Tejada, S. et al., "Learning Domain-Independent String Transformation Weights for High Accuracy Object Identification," Proceedings of the 8th ACM SIGKDD International Conference on Knowledge Discovery and Data Mining (SIGKDD '02), Jul. 23, 2002, Edmonton, Alberta, 10 pages.
Alvarez, M. et al., "FINDER: A Mediator System for Structured and Semi-Structured Data Integration," Proceedings of the 13th International Workshop on Database and Expert Systems Applications (DEXA '02), Sep. 6, 2002, Aix-en-Provence, France, 5 pages.
Lau, T. et al., "Programming by demonstration using version space algebra," Machine Learning, vol. 53, No. 1-2, Oct. 2003, 60 pages.
Lau, T. et al., "Learning Programs from Traces using Version Space Algebra," Proceedings of the 2nd International Conference on Knowledge Capture (K-CAP '03), Oct. 23, 2003, Sanibel Island, Florida, 8 pages.
"Planning, Installation, and Problem Determination Guide," Callpath Website, Available Online at https://web.archive.org/web/20040219025036/http://callpath.genesyslab.com/docs63/html/cpepipd/epipd142.htm, Available as Early as Feb. 19, 2004, Retrieved Feb. 24, 2010, 14 pages.
Lau, T. et al., "Programming shell scripts by demonstration," Proceedings of the AAAI-04 Workshop Program, W16: Supervisory Control of Learning and Adaptive Systems, Jul. 25, 2004, San Jose, California, 5 pages.
Gulwani, S. et al., "A Polynomial-Time Algorithm for Global Value Numbering," Proceedings of the 11th International Static Analysis Symposium (SAS 2004), LNCS 3148, Aug. 26, 2004, Verona, Italy, 17 pages.
Ko, A. et al., "Six Learning Barriers in End-User Programming Systems," Proceedings of the 2004 IEEE Symposium on Visual Languages—Human Centric Computing (VLHCC '04), Sep. 26, 2004, Rome, Italy, 8 pages.
"PADS Documentation," PADS Website, Retrieved Online at http://www.padsproj.org/doc.html, Available as Early as Mar. 20, 2005, Retrieved Jul. 5, 2010, 3 pages.
"Amazon.com: Tricks of the Microsoft Office gurus. (Business solutions): Paul. McFedries," Amazon Website, Offer to Sell Book, Available Online at https://www.amazon.com/Tricks-Microsoft-Office-Gurus-McFedries/dp/0789733692/ref=sr_1_2?ie=UTF8&qid=1488389104&sr=8-2&keywords=tricks+of+the+microsoft+office+gurus.+%28Business+solutions%29, Book Published Apr. 2005, 1 page.
Fisher, K. et al., "PADS: A Domain-Specific Language for Processing Ad Hoc Data," Proceedings of the 2005 ACM SIGPLAN Conference on Programming Language Design and Implementation (PLDI'05), Jun. 12, 2005, Chicago, Illinois, 10 pages.
Fisher, K. et al., "The Next 700 Data Description Languages," Conference Record of the 33rd ACM SIGPLAN-SIGACT Symposium on Principles of Programming Languages (POPL'06), Jan. 11, 2006, Charleston, South Carolina, 14 pages.
Myers, B. et al., "Invited Research Overview: End-User Programming," Proceedings of the Extended Abstracts on Human Factors in Computer Systems (CHI EA '06), Apr. 22, 2006, Montreal, Quebec, 6 pages.
Embley, D. et al., "Table-processing paradigms: a research survey," International Journal of Document Analysis, vol. 8, No. 2, Jun. 2006, Published Online May 9, 2006, 21 pages.
Solar-Lezama, A. et al., "Sketching Stencils," Proceedings of the 28th ACM SIGPLAN Conference on Programming Language Design and Implementation (PLDI'07), Jun. 11, 2007, San Diego, California, 12 pages.
Fisher, K. et al., "From Dirt to Shovels: Fully Automatic Tool Generation from Ad Hoc Data," Proceedings of the 35th Annual ACM SIGPLAN-SIGACT Symposium on Principles of Programming Languages (POPL'08), Jan. 7, 2008, San Francisco, California, 14 pages.
De Moura, L. et al., "Z3: An Efficient SMT Solver," Proceedings of the Theory and Practice of Software: 14th International Conference on Tools and Algorithms for the Construction and Analysis of Systems (TACAS'08/ETAPS'08), LNCS 4963, Mar. 29, 2008, Budapest, Hungary, 4 pages.
Lau, T., "Why PBD systems fail: Lessons learned from usable AI," Proceedings of the CHI 2008 Workshop on Usable Artificial Intelligence, Apr. 5, 2008, Florence, Italy, 4 pages.
Fisher, K. et al, "LearnPADS: Automatic Tool Generation from Ad Hoc Data," Proceedings of the 2008 ACM SIGMOD International Conference on Management of Data (SIGMOD '08), Jun. 9, 2008, Vancouver, British Columbia, 3 pages.
Zhang, Y. et al., "Editable Replay of IDE-based Repetitive Tasks," Proceedings of the 32nd Annual IEEE International Computer Software and Applications Conference (COMPSAC '08), Jul. 28, 2008, Turku, Finland, 8 pages.
Elhadi, M. et al., "Use of Text Syntactical Structures in Detection of Document Duplicates," Proceedings of the Third International Conference on Digital Information Management (ICDIM 2008), Nov. 13, 2008, London, United Kingdom, 6 pages.
Xi, Q. et al., "Ad Hoc Data and the Token Ambiguity Problem," Proceedings of the 11th International Symposium on Practical Aspect of Declarative Languages (PADL 2009), Jan. 19, 2009, Savannah, Georgia, 15 pages.
Guaitieri, D. et al., "Executive Summary of: Deputize End-User Developers to Deliver Business Agility and Reduce Costs," Excerpt Available Online at https://www.forrester.com/report/Deputize+EndUser+Developers+To+Deliver+Business+Agility+And+Reduce+Costs/-/E-RES54191, Apr. 15, 2009, 2 pages.
Gong, H. et al., "Automating Microsoft Office Word in Visual Basic," Proceedings of the Second International Symposium on Electronic Commerce and Security (ISECS '09), May 22, 2009, Nanchang, China, 5 pages.
Arasu, A. et al., "Learning String Transformations From Examples," Proceedings of the 35th International Conference on Very Large Data Bases (VLDB '09), Aug. 24, 2009, Lyon, France, 12 pages.
"Amazon.com: Artificial Intelligence: A Modern Approach (3rd Edition) (9780136042594)," Amazon Website, Offer to Sell Book, Available Online at https://www.amazon.com/Artificial-Intelligence-Modern-Approach-3rd/dp/0136042597, Book Published Dec. 11, 2009, 6 pages.
"Program Synthesis," Microsoft Research Website, Available Online at https://www.microsoft.com/en-us/research/project/program-synthesis/, Jan. 1, 2010, 4 pages.
Srivastava, S. et al., "From Program Verification to Program Synthesis," Proceedings of the 37th Annual ACM SIGPLAN-SIGACT Symposium on the Principles of Programming Languages (POPL '10), Jan. 17, 2010, Madrid, Spain, 14 pages.
Das Sarma, A. et al., "Synthesizing View Definitions from Data," Proceedings of the 13th International Conference on Database Theory (ICDT '10), Mar. 23, 2010, Lausanne, Switzerland, 15 pages.
Jha, S. et al., "Oracle-Guided Component-Based Program Synthesis," Proceedings of the 32nd ACM/IEEE International Conference on Software Engineering—vol. 1 (ICSE'10), May 2, 2010, Cape Town, South Africa, 10 pages.
"Amazon.com: Excel 2010 Formulas (Mr. Spreadsheet's Bookshelf) (9780470475362)," Amazon Website, Offer to Sell Book, Available Online at https://www.amazon.com/Excel-2010-Formulas-John-Walkenbach/dp/0470475366/ref=mt_paperback?_encoding=UTF8&me=, Book Published May 24, 2010, 6 pages.

(56) References Cited

OTHER PUBLICATIONS

Chaudhuri, S. et al., "Smooth Interpretation," Proceedings of the 31st ACM SIGPLAN Conference on Programming Language Design and Implementation (PLDI '10), Jun. 5, 2010, Toronto, Ontario, 13 pages.
Kuncak, V. et al., "Complete Functional Synthesis," Proceedings of the 31st ACM SIGPLAN Conference on Programming Language Design and Implementation (PLDI '10), Jun. 5, 2010, Toronto, Ontario, 14 pages.
Xi, Q. et al., "A Context-free Markup Language for Semi-structured Text," Proceedings of the 31st ACM SIGPLAN Conference on Programming Language Design and Implementation (PLDI '10), Jun. 5, 2010, Toronto, Ontario, 12 pages.
"Sumit Gulwani's Homepage," Microsoft Research Website, Available Online at https://www.microsoft.com/en-us/research/people/sumitg/, Retrieved Jul. 5, 2010, 4 pages.
Gulwani, S., "Dimensions in Program Synthesis," Proceedings of the 12th International ACM SIGPLAN Symposium on Principles and Practice of Declarative Programming (PPDP'10), Jul. 26, 2010, 12 pages.
Gulwani, S., "Automating String Processing in Spreadsheets Using Input-Output Examples," Proceedings of the 38th Annual SIGPLAN-SIGACT Symposium on Principles of Programming Languages (PoPL'11), Jan. 26, 2011, Austin, Texas, 13 pages.
"International Search Report and Written Opinion Issued in PCT Application No. PCT/US2017/057779", dated Dec. 6, 2017, 11 Pages.
"Non Final Office Action Issued in U.S. Appl. No. 15/299,329", dated Sep. 7, 2018, 24 Pages.
Gulwani, Sumit, "Programming by Examples.", Retrieved From: https://www.microsoft.com/en-us/research/wp-content/uploads/2016/12/pbe16.pdf :, Dec. 1, 2016, 22 Pages.
Harris, W. et al., "Spreadsheet Table Transformations from Examples," Proceedings of the 32nd ACM SIGPLAN Conference on Programming Language Design and Implementation (PLDI '11) Jun. 4, 2011, San Jose, California, 17 pages.
Singh, R. et al., "Learning Semantic String Transformations from Examples," Proceedings of the VLDB Endowment, vol. 5, No. 8, Apr. 2012, 16 pages.
Singh, R. et al., "Synthesizing Number Transformations from Input-Output Examples," Proceedings of the 24th International Conference on Computer Aided Verification (CAV 2012), LNCS 7358, Jul. 7, 2012, Berkeley, California, 72 pages.
ISA Korean Intellectual Property Office, International Search Report and Written Opinion Issued in Application No. PCT/US2011/037411, dated Feb. 9, 2012, WIPO, 8 pages.
United States Patent and Trademark Office, Office Action Issued in U.S. Appl. No. 12/834,031, dated May 10, 2012, 16 pages.
United States Patent and Trademark Office, Office Action Issued in U.S. Appl. No. 12/834,031, dated Oct. 15, 2012, 16 pages.
European Patent Office, European Search Report Issued in Application No. 11790189.2, dated Oct. 21, 2013, Germany, 2 pages.
European Patent Office, Office Action Issued in Application No. 11790789.2, dated Nov. 4, 2013, Germany, 6 pages.
United States Patent and Trademark Office, Office Action Issued in U.S. Appl. No. 13/020,153, dated Nov. 14, 2013, 10 pages.
United States Patent and Trademark Office, Office Action Issued in U.S. Appl. No. 12/834,031, dated Jan. 3, 2014, 20 pages.
State Intellectual Property Office of the People's Republic of China, Office Action and Search Report Issued in Application No. 201210023688.6, dated Jan. 30, 2014, 13 pages.
United States Patent and Trademark Office, Notice of Allowance Issued in U.S. Appl. No. 13/020,153, dated Mar. 20, 2014, 5 pages.
United States Patent and Trademark Office, Office Action Issued in U.S. Appl. No. 12/834,031, dated Jun. 5, 2014, 24 pages.
State Intellectual Property Office of the People's Republic of China, Office Action Issued in Application No. 201210023688.6, dated Sep. 12, 2014, 7 pages.
European Patent Office, Office Action Issued in Application No. 11790189.2, dated Dec. 3, 2014, Germany, 3 pages.
State Intellectual Property Office of the People's Republic of China, Office Action and Search Report Issued in Application No. 201180027421.8, dated Jan. 27, 2015, 11 pages.
European Patent Office, Office Action Issued in Application No. 11790189.2, dated Feb. 9, 2015, Germany, 3 pages.
Raeder, J., "Programming in Pictures," Doctoral Dissertation in Philosophy (Computer Science), University of Southern California, Nov. 1984, 267 pages.
Hartl, A., "A Visual Rendering of a Semantic Wiki Query Language," Diploma Thesis, Munich Institute of Computer Science, Oct. 29, 2009, 122 pages.
Bansal, S., "Create an Excel Drop Down list with Search Suggestions," Trump EXCEL Website, Available Online at https://trumpexcel.com/excel-drop-down-list-with-search-suggestions/, Oct. 2013, 11 pages.
Gulwani, "Programming by Examples (and its applications in Data Wrangling)," In Book "Verification and Synthesis of Correct and Secure Systems," IOS Press, Jan. 1, 2016, 22 pages.
Gulwani, S. et al., "Spreadsheet Data Manipulation Using Examples," Communications of the ACM, vol. 55, No. 8, Aug. 2012, 9 pages.
Singh, R. et al., "Transforming Spreadsheet Data Types using Examples," Proceedings of the 43rd Annual ACM SIGPLAN-SIGACT Symposium on Principles of Programming Languages (POPL '16), Jan. 20, 2016, St. Petersburg, Florida, 14 pages.
"Smart Autofill Spreadsheets Add On," Google Cloud Platform Website, Available Online at https://cloud.google.com/prediction/docs/smart_autofill_add_on, As Last Updated Aug. 19, 2016, 9 pages.
Wang, X. et al., "FIDEX: Filtering Spreadsheet Data using Examples," Proceedings of the 2016 ACM SIGPLAN International Conference on Object-Oriented Programming, Systems, Languages, and Applications (OOPSLA 2016), Oct. 25, 2016, Amsterdam, The Netherlands, 20 pages.
"Emftext User Guide", http://www.emftext.org/EMFTextGuide.php, Jun. 1, 2012, 39 pages.
Choudhury, et al., "How Does the Data Sampling Strategy Impact the Discovery of Information Diffusion in Social Media", In Proceedings of the Fourth International AAAI Conference on Weblogs and Social Media, May 23, 2010, pp. 34-41.
"Final Office Action Issued in U.S. Appl. No. 15/299,329", dated Mar. 18, 2019, 21 Pages.
"Non-Final Office Action Issued in U.S. Appl. No. 15/299,412", dated Nov. 21, 2019, 28 Pages.
Webb, Chris, "New Ways to Concatenate Text in Excel 2016 with Concat( ) and Text Join( )", Retrieved from: https://blog.crossjoin.co.uk/2016/02/05/new-ways-to-concatenate-text-in-excel-2016-with-concat-and-textjoin/, Feb. 5, 2016, 3 Pages.
Li, et al., "Efficient Interactive fuzzy keyword search", In Proceedings of the 18th international conference on World wide web, Apr. 20, 2009, pp. 371-380.
"Non Final Office Action Issued in U.S. Appl. No. 15/299,329", dated Dec. 9, 2019, 14 Pages.
"Final Office Action Issued in U.S. Appl. No. 15/299,412", dated Mar. 26, 2020, 27 Pages.
Johnson, et al., "Working with Formulas and Functions in Excel 2013", Retrieved From: https://www.informit.com/articles/article.aspx?p=2031329, May 8, 2013, 4 Pages.
Hood, Jon, "Excel: Use Flash Fill, Concatenate and Text to Columns", Retrieved From: https://www.knowledgewave.com/blog/msoffice/excel-use-flash-fill-concatenate-and-text-to-columns.html, May 5, 2015, 13 Pages.
John, "How to Concatenate a Range with a Delimiter", Retrieved From: https://www.howtoexcel.org/vba/how-to-concatenate-a-range-with-a-delimiter/, Apr. 20, 2016, 5 Pages.
"Final Office Action Issued in U.S. Appl. No. 15/299,329", dated May 4, 2020, 16 Pages.
"Non Final Office Action Issued in U.S. Appl. No. 15/299,412", dated Aug. 12, 2020, 27 Pages.

\* cited by examiner

```
┌─────────────────────────────────────────────────────┐
│ PROFILING A LARGER DATASET TO IDENTIFY A PLURALITY  │
│ OF PATTERNS, EACH OF WHICH IS DESCRIPTIVE OF ONE    │
│ OR MORE RECORDS HELD IN THE LARGER DATASET          │
│                                                 202 │
└─────────────────────────────────────────────────────┘
                          ↓
┌─────────────────────────────────────────────────────┐
│ FILLING EACH OF A PLURALITY OF SLOTS OF A SMALLER   │
│ DATASET WITH RECORDS HELD IN THE LARGER DATASET     │
│                                                 204 │
└─────────────────────────────────────────────────────┘
                          ↓
┌─ ─ ─ ─ ─ ─ ─ ─ ─ ─ ─ ─ ─ ─ ─ ─ ─ ─ ─ ─ ─ ─ ─ ─ ─ ─ ┐
│ GENERATING A PATTERN-BASED SAMPLE SET HAVING A      │
│ PLURALITY OF PATTERN SLOTS CORRESPONDING TO THE     │
│ PLURALITY OF PATTERNS IDENTIFIED IN THE LARGER      │
│ DATASET                                             │
│                                                 206 │
└─ ─ ─ ─ ─ ─ ─ ─ ─ ─ ─ ─ ─ ─ ─ ─ ─ ─ ─ ─ ─ ─ ─ ─ ─ ─ ┘
                          ↓
┌─────────────────────────────────────────────────────┐
│ INDIVIDUALLY RETRIEVING MULTIPLE RECORDS HELD IN    │
│ THE LARGER DATASET                                  │
│                                                 208 │
└─────────────────────────────────────────────────────┘
                          ↓
┌─────────────────────────────────────────────────────┐
│ FOR EACH RETRIEVED RECORD, DETERMINE WHETHER TO     │
│ (A) PLACE THE RETRIEVED RECORD INTO A SLOT OF THE   │
│   SMALLER DATASET AND EVICT A RECORD ALREADY        │
│   OCCUPYING THAT SLOT; OR (B) NOT PLACE THE         │
│   RETRIEVED RECORD INTO THE SMALLER DATASET         │
│                                                 210 │
└─────────────────────────────────────────────────────┘
```

RECORD PROFILING FOR DATASET SAMPLING

BACKGROUND

Datasets held by computers often include large numbers of individual records, such as alphanumeric strings, values, and/or other types of computer data. Records within the datasets can be transformed, processed, and/or otherwise manipulated in a variety of ways. Such dataset manipulation often includes evaluation of records in a smaller dataset that serves as a sample of records held in the larger dataset.

DETAILED DESCRIPTION

Databases, spreadsheets, and other types of datasets are used in a variety of situations, and can often hold thousands or even millions of individual records in different data formats. A common desire when working with such datasets is to generate a smaller dataset holding records sampled from the larger dataset. This type of sampling can be done in order to identify patterns or trends in the larger dataset without having to expend unnecessary computational resources evaluating every record in the larger dataset. As another example, a smaller sample dataset may be processed in order to generate a transformation program that will be applied to the larger dataset, in order to, for example, convert records in the larger dataset to a different format. It is therefore generally desirable that the records held in the smaller dataset be as representative as possible of the diversity of record formats held in the larger dataset.

However, identifying which records of the larger dataset to include in the smaller dataset can be a difficult and time consuming process. Relying solely on random selection can result in a smaller dataset that does not suitably represent record diversity in the larger dataset. This can be partially alleviated by using relatively larger sample sizes, though this runs counter to the primary goal of creating a smaller dataset. In general, existing solutions often fail to efficiently sample the larger dataset, meaning that the resultant smaller dataset is not suitably representative and/or is unnecessarily large.

Accordingly, the present disclosure addresses the problem of generating a sample dataset that is both representative of and significantly smaller than a primary dataset. The technical solution used to address this problem includes profiling the larger dataset in order to identify patterns that describe records held in the larger dataset. The larger dataset is then sampled in order to identify suitable records to add to the smaller dataset, with the primary goal of representing as many unique patterns in the smaller dataset as possible. As a secondary consideration, the sampling may be done so as to increase representation in the smaller dataset of unique pattern combinations across multiple data columns. As a result, the smaller dataset is filled with records sampled from the larger dataset that are representative of the diversity of record formats in the larger dataset. Processing and/or manipulation of this smaller dataset may then be performed in order to identify trends in the data, generate a transformation program, etc. Profiling and sampling a larger dataset in this manner can improve the functioning of an underlying computer system by allowing a user to easily and efficiently interpret and manipulate datasets that would be too prohibitively large to experiment with computationally. Profiling and sampling can allow a user to iteratively develop a transformation program, and confirm the efficacy of the transformation program by applying it to the smaller dataset before using it on the larger dataset.

The present disclosure primarily uses the term "record" to refer to individual data entries in a dataset. However, it will be appreciated that larger and smaller datasets as described herein may include virtually any suitable type of data. For example, records held in the larger and smaller datasets may be alphanumeric strings. Additionally, or alternatively, records may take the form of values, expressions, variables, etc. It will be appreciated that regardless of the format of records held in a larger dataset, these records may be profiled and sampled as described herein.

Figure 1:
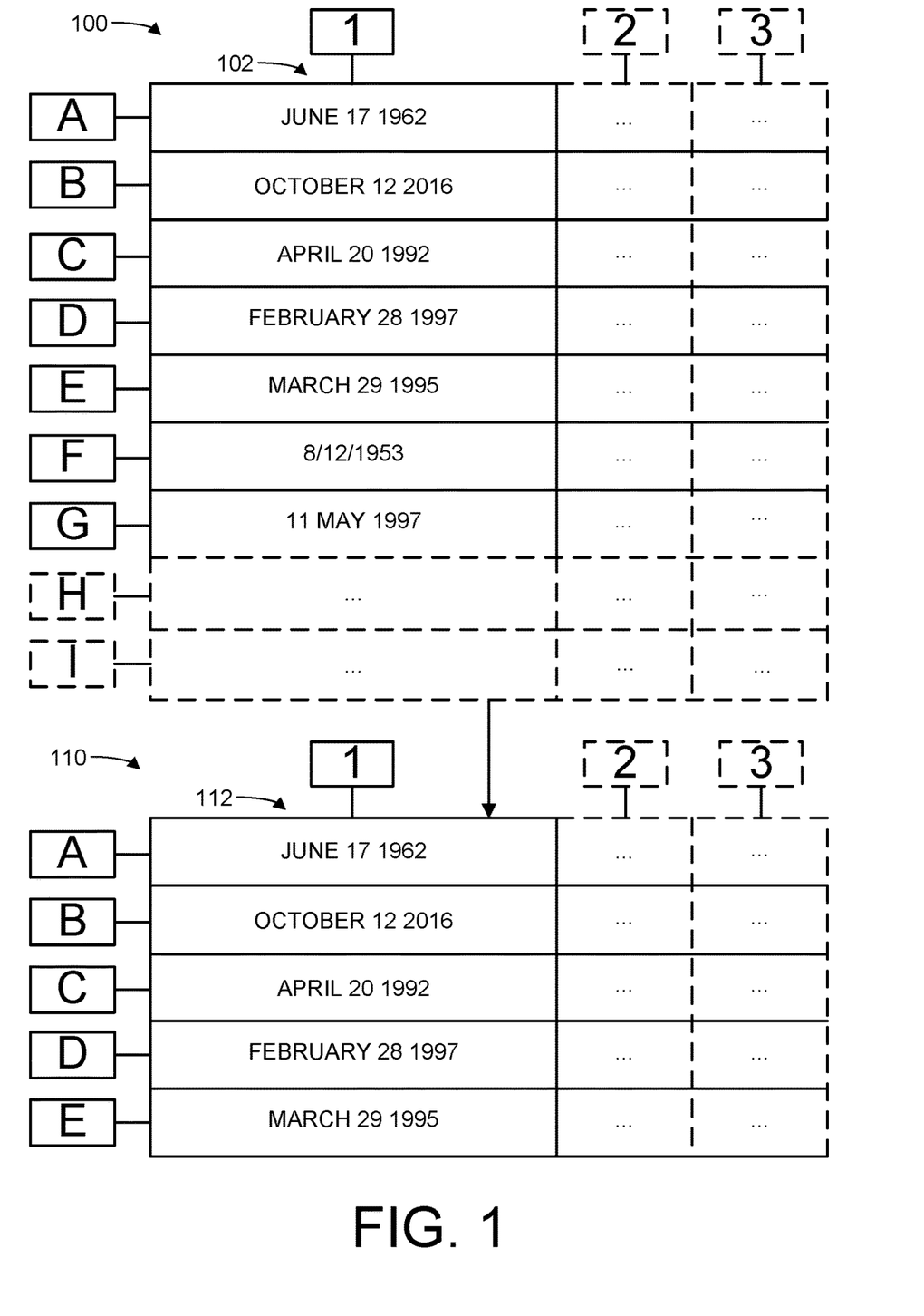
FIG. 1 schematically shows an example larger dataset and an associated smaller dataset holding records from the larger dataset.

FIG. 1 shows an example of a larger dataset 100 including a number of example records 102. It will be appreciated that datasets as described herein may include data held on one or more storage machines of one or more computer systems and presented via any of a variety of suitable displays. A computing system involved in profiling/sampling of a larger dataset may have a variety of form factors, including a desktop computer, laptop computer, server, tablet computer, smartphone, wearable device, etc. Further, the dataset profiling and sampling techniques described herein may be distributed across multiple computers. For example, a computer that profiles a larger dataset and generates a smaller dataset may be different from a computer that stores and manages the larger dataset that is profiled and sampled. Further, storage of the larger dataset may be distributed between multiple storage machines associated with numerous computing systems, as will be described below. A computing system that profiles and samples a larger dataset as described herein may be implemented as computing system 700, described below with respect to FIG. 7.

Further, the appearance of dataset 100, as well as other datasets described below, is not intended to limit the present disclosure. It will be appreciated that any visual elements or user-interface elements described herein or illustrated in the figures are examples, and are only intended to serve as visual aids. Larger datasets, smaller datasets, records data columns, patterns, etc., as described herein may have any suitable appearance, and may be interacted with by a user in a variety of ways.

Records held in larger dataset 100 are referred to herein according to the labels appended to each row and column of larger dataset 100. For example, the string "JUNE 17 1962" is referred to as 102A1, given its position in row A and column 1. Similarly, the string "MARCH 29 1995" is referred to as 102E1, given its position in row E and column 1.

Larger dataset 100 includes seven unique records (i.e., records 102A1-102G1). However, it will be appreciated that larger datasets, such as dataset 100, may include any number of records. In fact, larger dataset 100 is shown as having two additional rows, rows H and I, holding the placeholder text " . . . ". This is intended to convey that the larger dataset may have any number of additional rows holding any number of additional records. Further, datasets as described herein may have any number of data columns, and records may be held in each data column. Accordingly, larger dataset 100 is shown as having data columns 2 and 3, though cells in these data columns are again filled with placeholder text. This is intended to indicate that the larger dataset may have any number of data columns, and each data column may include any number of records. Indeed, whether entries are described via columns, records, fields, etc., it will be appreciated that the systems herein may be implemented in connection with thousands, millions, etc. of such data items.

Throughout the disclosure, reference is made to datasets having rows and columns. It will be appreciated that, in general, a dataset as described herein includes multiple data fields, which may take the form of rows and/or columns. In general, datasets may be organized in any suitable way, including via organization schemes that do not conform to the typical row/column spreadsheet paradigm.

Also shown in FIG. 1 is a smaller dataset 110 that includes a number of records 112 that have been sampled from larger dataset 100. Smaller dataset 112 is shown as having five slots per data column, and each of these five slots has been filled with a different record. It will be appreciated that a smaller dataset may have any number of fillable slots, though the total number of records held in the smaller dataset will typically be much less than the number of records held in the larger dataset. In some cases, the size of the smaller dataset may be specified in advance by a user. As an alternative, the size of the smaller dataset may be automatically determined by the computing system, based on the purpose for which the smaller dataset is being generated, for example. Further, in some cases, rather than having a particular number of slots, a smaller dataset can have a maximum size in bytes (e.g., 10 megabytes). Smaller dataset 112 is also shown having the same number of data columns as larger dataset 100. However, in some cases the smaller dataset may have fewer data columns than the larger dataset, for example when the smaller dataset is generated for a purpose that only requires that records from certain columns be sampled.

As shown in FIG. 1, records 102A1-102E1 have been sampled from larger dataset 100 and added to smaller dataset 110 as records 112A1-112E1. In other words, the computing system simply filled the five slots of the smaller dataset with the first five records present in the larger dataset. As a result, the records in the smaller dataset all have the same general format (i.e., "MONTH DD YYYY"), despite the fact that records having different formats are present in the larger dataset. Accordingly, the smaller dataset does not adequately represent the diversity of records held in the larger dataset. This can cause problems in the event that smaller dataset 112 is used to identify trends in the larger dataset, or records 112 are used as example inputs for generating a transformation program, for example.

Figure 2:
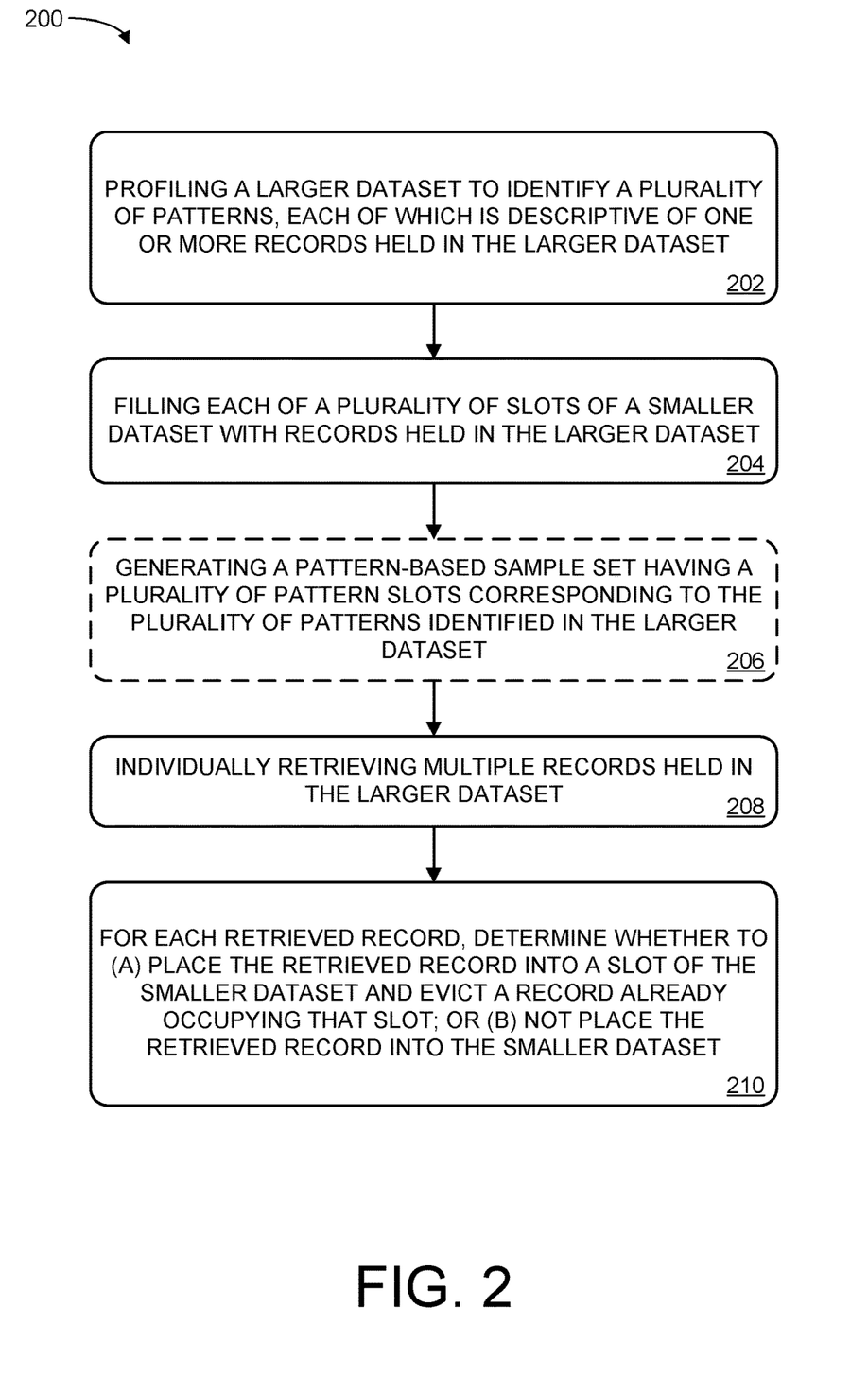
FIG. 2 illustrates an example method for generating a smaller dataset from a larger dataset.

Accordingly, FIG. 2 shows an example method 200 for generating a smaller dataset from a larger dataset. At 202, method 200 includes profiling a larger dataset to identify a plurality of patterns, each of which is descriptive of one or more records held in the larger dataset. In other words, a computer system may analyze a larger dataset in order to create a dataset profile including a set of patterns. In some implementations, a separate profile may be created for each data column of a dataset that includes more than one data column. Accordingly, records held in each data column may be profiled independently, and sampled according to different sets of patterns.

Profile creation may be done in a variety of suitable ways. For example, a profile may be automatically created by the computing system. This may, for example, involve the computing system evaluating each individual record in the larger dataset and grouping the records into multiple clusters, each of which is described by a different pattern. Alternatively, a profile may be manually authored by a user who defines patterns that the user knows to be present in the dataset. In some implementations, a hybrid approach may be used, in which a user provides guidance to an automatic profiler. For example, the user may specify that certain records should be interpreted as numerals rather than strings, or specify that certain records represent geographic locations. In general, a profile of a dataset may be created in any number of suitable ways.

As used herein, a pattern is a general description of a format that one or more records held in the larger dataset conform to. Specifically, each pattern may describe a unique format exhibited by one or more records of the larger dataset. The specific format described by a pattern can be as general or specific as needed—i.e., it may have any suitable granularity. For example, a particular pattern may include any records that include alphanumeric characters, while a different pattern may only include those records that include a specific sequence of characters, and another pattern includes records that are recognized as being abbreviations for location names. It will be appreciated that patterns can also describe records other than alphanumeric strings. For example, a pattern could describe all numbers that are integers, all numbers that fall within a threshold of a certain value, etc.

In some implementations, the same record may be described by more than one pattern. For example, a record including the characters "OR" may be described by a pattern that specifies any records taking the form of two adjacent capital letters, and also described by a pattern that specifies records that are abbreviations of location names (i.e., the state of Oregon). Patterns may in some cases be domain-specific, meaning they specifically describe location abbreviations, social security numbers, telephone numbers, etc. In some cases, patterns may be given labels, names, tags, etc., so they can be more effectively managed and organized. In cases where a single record is described by multiple patterns, determining whether to add the record to a smaller dataset may be done according to a representation status of a least-represented pattern describing the record, as will be described below.

Patterns may additionally or alternatively be organized according to a pattern hierarchy. For example, for a list of phone numbers having different formats, a particular pattern may describe any records having the format "XXX-XXX-XXXX." However, additional analysis may determine that every phone number in the list has one of three different possible area codes (i.e., the first three digits of the phone number). Accordingly, the system may generate three "sub-patterns," each of which is specific to one of the three different area codes represented in the dataset. As another example, a pattern that identifies two-letter state abbreviations may be a sub-pattern of a pattern that identifies two-letter strings, which may further be a sub-pattern of a pattern that identifies alphabet-only strings.

Figure 3A:
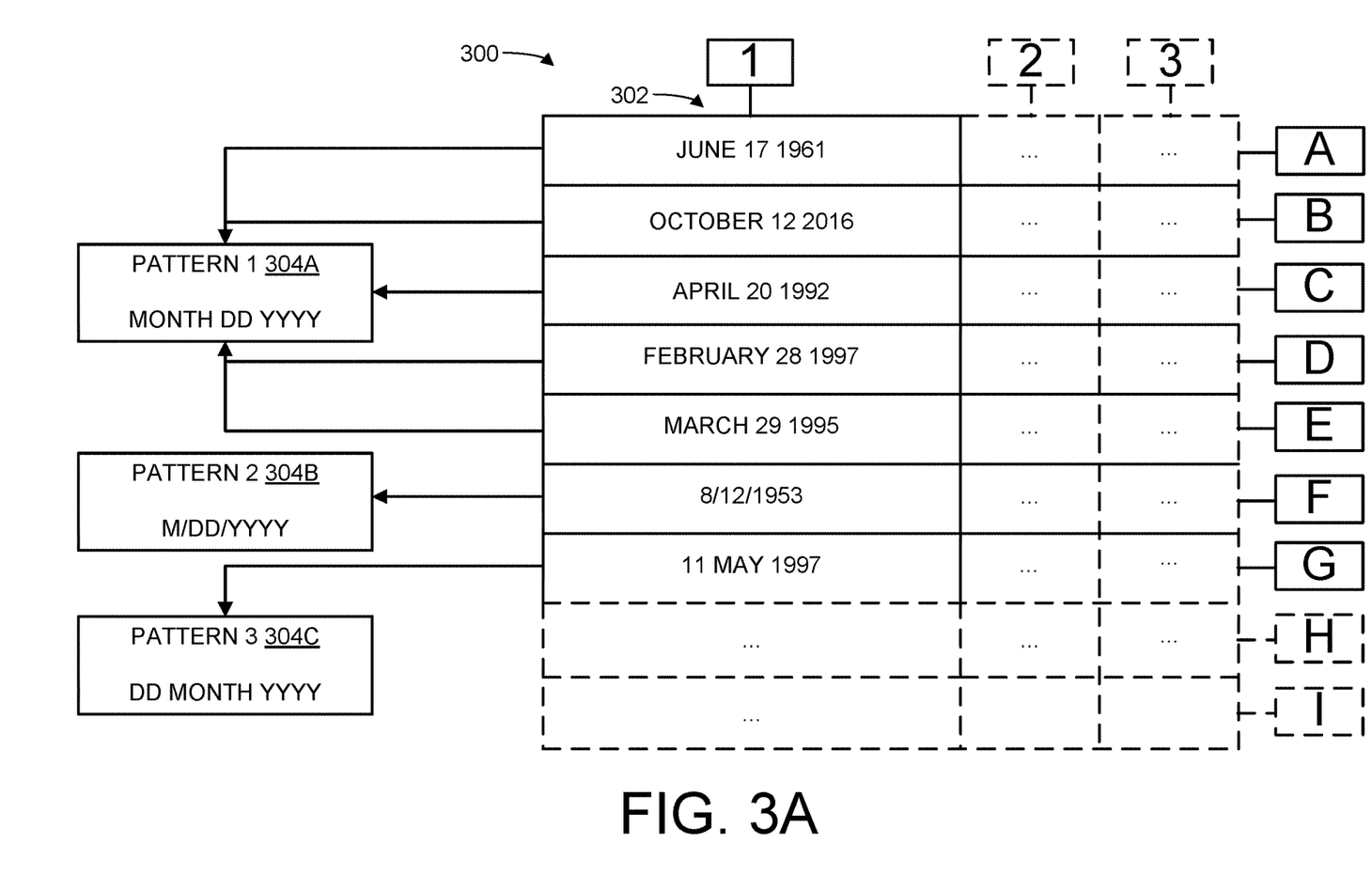
FIG. 3A schematically shows profiling of an example larger dataset to identify a plurality of patterns.

Identification of patterns in a dataset is schematically illustrated in FIG. 3A. FIG. 3A shows a larger dataset 300 including a number of records 302. Profiling of the larger dataset has identified three different patterns: pattern 1 (304A), pattern 2 (304B), and pattern 3 (304C). As shown, each pattern describes a different record format. Specifically, pattern 1 describes all records having the general format "MONTH DD YYYY." Records 302A1-302E1 are described by pattern 1. Similarly, pattern 2 describes record 302F1, having the format "M/DD/YYYY," and pattern 3 describes record 302G1, having the format "DD MONTH YYYY."

Notably, each pattern shown in FIG. 3A describes at least one record in the larger dataset. As described above, a single record may in some cases be described by multiple different patterns, though this is not shown in FIG. 3A. For example, a fourth pattern may describe any records that describe calendar dates. Each record shown in dataset 300 would then be described by this pattern, in addition to the more specific patterns described above.

Figure 3B:
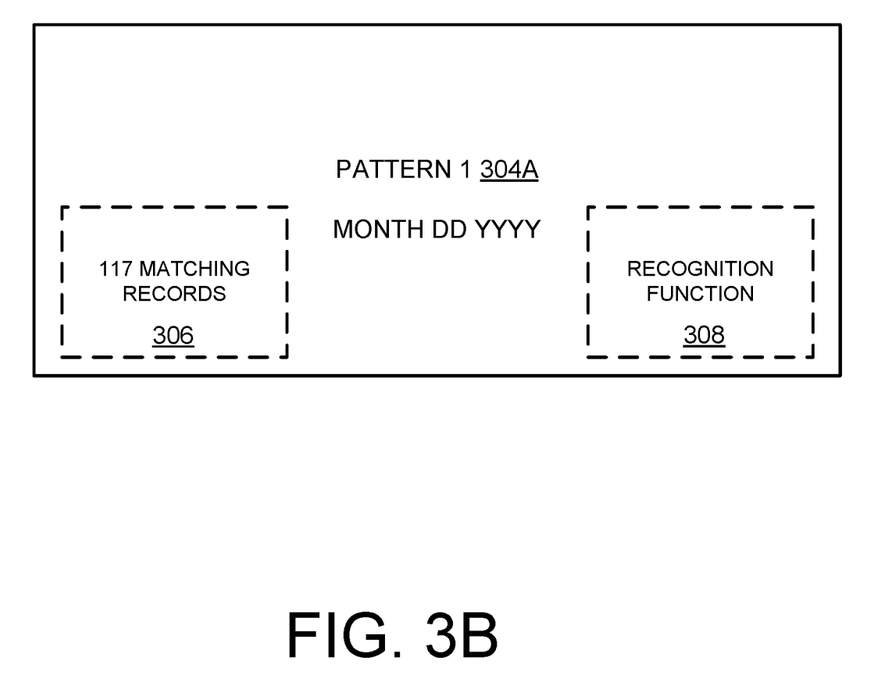
FIG. 3B schematically shows an example pattern identified via profiling of a larger dataset.

In some implementations, each pattern may include a count of a number of records in the larger dataset described by the pattern. This is shown in FIG. 3B, which schematically shows pattern 1 (304A) from FIG. 3A. It will be appreciated that FIG. 3B is only intended to serve as a graphical representation of aspects of a pattern that may not actually be visible to a user, or may have an appearance that is different from the one shown. As shown, pattern 304A includes a count 306 of the number of records in the larger dataset that are described by the pattern.

A pattern may additionally include a recognition function for identifying records in the larger dataset that are described by the pattern. This is also shown in FIG. 3B, in which pattern 1 includes a recognition function 308 for identifying records in dataset 300 that have the general format of "MONTH DD YYYY." A recognition function may take any suitable form, though will generally include a set of computer operations or instructions usable for isolating specific records in a larger dataset. A recognition function may be used to compile the count of the number of records in the larger dataset that are described by the pattern, such count 306 described above. A regular expression usable to identify particular alphanumeric strings may be an example of a recognition function. In some implementations, a recognition function may be implemented via one or more standard libraries associated with a particular computer programming language.

Returning to FIG. 2, at 204, method 200 includes filling each of a plurality of slots of the smaller dataset with records held in the larger dataset. Filling of a smaller dataset may be done in virtually any way, according to any filling or sampling strategy. As an example, a smaller dataset having a total size of k records may be filled with the first k records held in the larger dataset. Smaller dataset 110 shown in FIG. 1 was filled according to this strategy, as it includes the first five records from larger dataset 100. As an alternative, slots in the smaller dataset may be filled with records that have been randomly selected from the larger dataset. Further still, the computing system may deliberately fill the smaller dataset with records that are described by different patterns, and/or select records that have a similar pattern distribution to the larger dataset. In some implementations, determining whether to place a particular record in the smaller dataset may depend on a pattern of the particular record and a representation status of that pattern. For example, a particular record may not be placed in the smaller dataset even while the smaller dataset still has empty slots if a pattern of the particular record is already well-represented. In general, the specific method used to select the records that are initially added to the smaller dataset is largely irrelevant, provided that the smaller dataset is eventually filled with records that are held in the larger dataset.

As described above, in some cases the smaller dataset may not have a size that is expressed in slots, or total records held. Rather, the smaller dataset may have a predetermined size that is expressed in terms of computer bytes, and the smaller dataset may be filled with records until it has a total size in bytes that is at or near the predetermined size.

At 206, method 200 optionally includes generating a pattern-based sample set having a plurality of pattern slots, the plurality of pattern slots corresponding to the plurality of patterns identified in the larger dataset. Each pattern slot in the pattern-based sample set corresponds to a different pattern of the plurality of patterns, and is filled with a record from the larger dataset that is described by that pattern.

Figure 4:
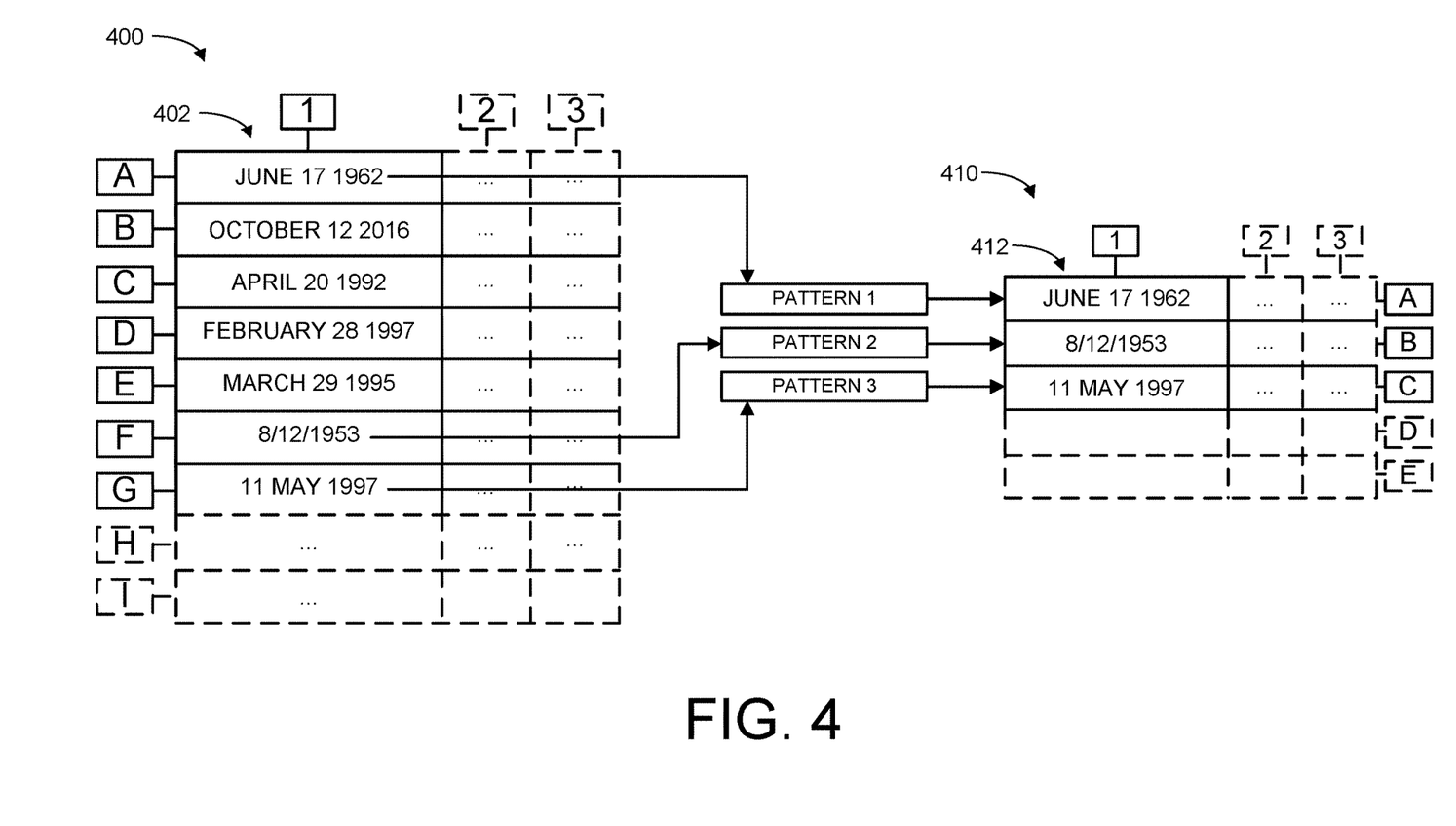
FIG. 4 schematically shows an exemplary filling of a pattern-based sample set with records held in a larger dataset.

Generation and filling of a pattern-based sample set is schematically shown in FIG. 4, which shows an example larger dataset 400 holding a number of records 402. FIG. 4 also shows an example pattern-based sample set 410 holding a number of records 412. As shown, pattern-based sample set 410 has a number of pattern slots, each corresponding to a different pattern identified in dataset 400. Specifically, pattern-based sample set 410 has been filled with records 412A1-412C1, corresponding to records 402A1, 402F1, and 402G1 in dataset 400. Record 402A1 is described by pattern 1, and accordingly has been added to a pattern slot of the pattern-based sample set corresponding to pattern 1. Similarly, record 402F1 is described by pattern 2 and record 402G1 is described by pattern 3, and these records have also been added to pattern slots of the pattern-based sample set corresponding to patterns 2 and 3.

Figure 5:
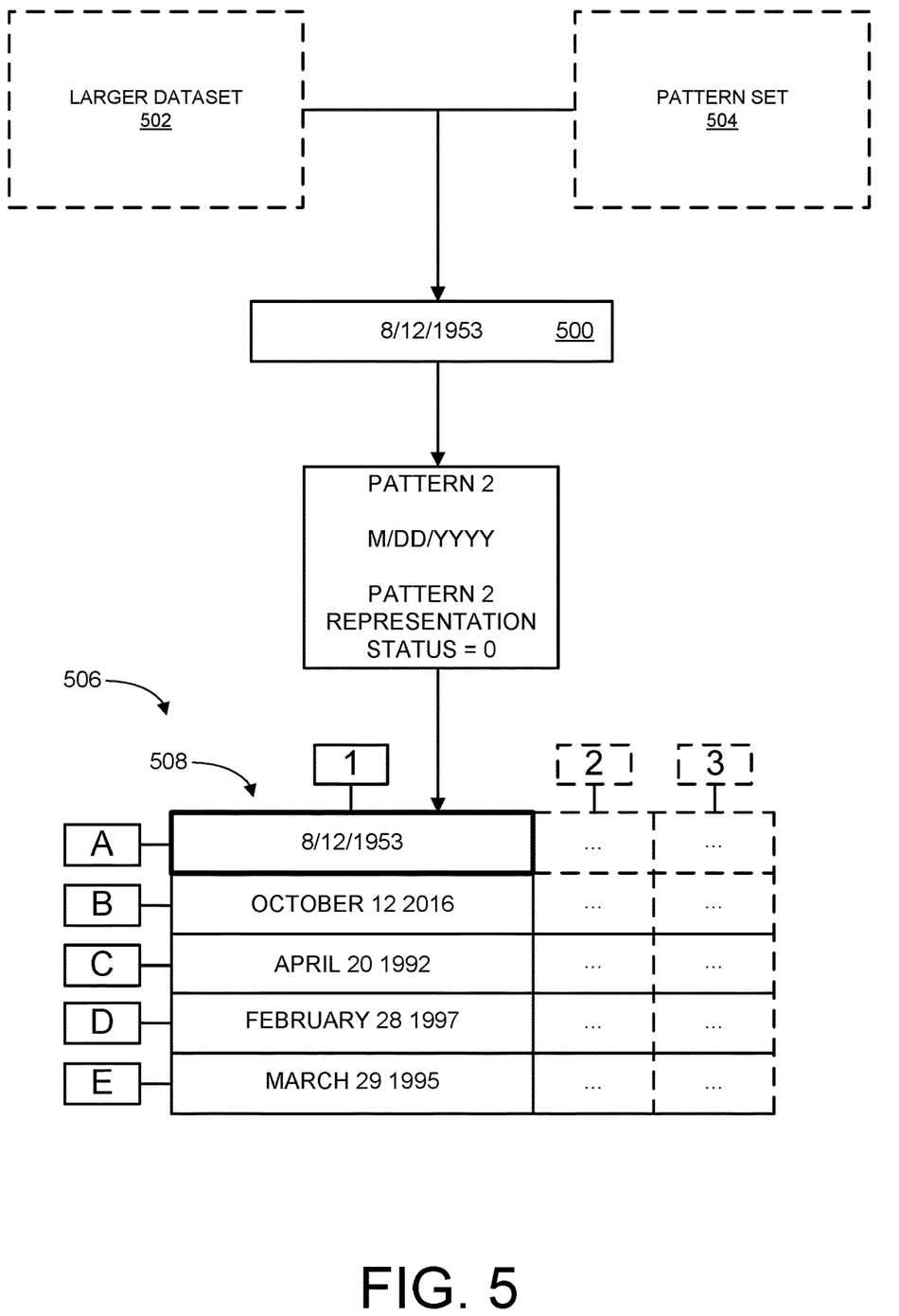
FIG. 5 schematically shows retrieving of a record held in a larger dataset and addition of the retrieved record to a smaller dataset.

Returning to FIG. 2, at 208, method 200 includes individually retrieving multiple records held in the larger dataset. This is schematically illustrated in FIG. 5, which shows retrieval of an example record 500 including the characters "8/12/1953." This record is held in a larger dataset 502. Though not shown in detail in FIG. 5, larger dataset 502 includes a number of records, one of which is record 500. In some implementations, prior to individually retrieving records, a computing system may first generate a pattern-based sample set, such as pattern-based sample set 504 shown in FIG. 5. This pattern-based sample set may be generated and filled with records from the larger dataset as described above with respect to FIG. 4. Notably, while the individually retrieved records are held in the larger dataset, they may be retrieved either directly from the larger dataset, or indirectly after first having been added to the pattern-based sample set. This is indicated in FIG. 5, in which record 500 is shown as being retrieved either from larger dataset 502 or pattern-based sample set 504.

Retrieval of only a single record is shown in FIG. 5. However, it will be appreciated that of the multiple records held in larger dataset 502, multiple such records are retrieved. In some implementations, every record in the larger dataset may be individually retrieved, though in other implementations only some of the records held in the larger dataset may be individually retrieved. For example, a user may indicate that a smaller dataset should only include records having a particular pattern, drawn from a particular data column, etc., and record retrieval may then be carried out according to the user's specifications. One or more retrieved records may be added to a smaller dataset, as will be described below.

Returning briefly to FIG. 2, at 210, method 200 includes, for each retrieved record, determining whether to (a) place the retrieved record into a slot of the smaller dataset and evict a record already occupying that slot; or (b) not place the retrieved record into the smaller dataset. This determination is based on a pattern of the retrieved record as well as a representation status of that pattern in the smaller dataset. In cases where the smaller dataset has a predetermined size in bytes, then the method may include determining whether to place a retrieved record into the smaller dataset and, if placing the record in the smaller dataset would exceed the predetermined size in bytes, evict a record already in the smaller dataset. This may be relevant when, for example, records in the larger dataset have a variety of different lengths/sizes, and some records require more storage space in bytes than others.

As stated above, the profiling and sampling described herein is done so as to generate a smaller dataset that is representative of the diversity of data formats found in the larger dataset. Accordingly, the above-cited determining may be done so as to increase the number of unique patterns represented in the smaller dataset. In other words, for a particular record that is described by a particular pattern, the decision of whether to place that record in the smaller dataset may depend on a representation status of that record's pattern, the representation status indicating how well represented that record's pattern is in the smaller dataset. This determination may also be done so as to increase representation of unique pattern combinations across two or more data columns, as will be described below.

When determining which records to add to a smaller dataset, a computing system may assign a "value" score to each retrieved record based on a representation status of one or more patterns that describe the record. A value score of a retrieved record is inversely proportional to the number of records already in the smaller dataset that are described by a same pattern as the retrieved record. Accordingly, if a retrieved record (retrieved either from the larger dataset or the pattern-based sample set, as described above) is described by a pattern that is not yet represented in the smaller dataset at all (i.e., representation status of zero), then that record would be assigned a relatively high value score, causing that record to be added to the smaller dataset. Similarly, if a retrieved record is described by a pattern that is already well-represented in the smaller dataset, then the retrieved record may not be added to the smaller dataset. It follows then that a record corresponding to a pattern that is only represented once or twice in the smaller dataset would be more valuable than a record having a pattern that is represented many times. This determination may be done by comparing the value score of the retrieved record to the value score of each record already in the smaller dataset. If the retrieved record has a higher value score than at least one record in the smaller dataset, then a lowest-scoring record in the smaller dataset may be evicted and replaced by the retrieved record. A value score may also be assigned based on whether a retrieved record's pattern would serve to improve representation of a unique pattern combination across two or more data columns.

In alternate implementations, determining whether to add a particular record to the smaller dataset may depend solely on whether a pattern of the record is already represented. For example, in the event that a record is retrieved from a pattern-based sample set, then it may be added to the smaller dataset if the pattern corresponding to the record is not already represented. Similarly, if the pattern corresponding to the record is already represented, then the record is not added to the smaller dataset, and the next record is retrieved.

As described above, a single record may in some cases be described by multiple different patterns. Accordingly, based on a retrieved record being described by more than one pattern, the determination of whether to place the record in the smaller dataset may be done according to a representation status of a least-represented pattern describing the retrieved record. In other words, a record that is described by a pattern that is poorly represented in the smaller dataset may be added to the smaller dataset, even if the record is also described by other patterns that are already well-represented, and would therefore mark the record as being relatively less "valuable."

In addition to or in lieu of sampling a larger dataset in order to increase the number of unique patterns in a smaller dataset, sampling may be done so as to ensure that an overall pattern distribution in the smaller dataset is approximately equal to the pattern distribution of the larger dataset. As an example, 90% of the records in the larger dataset may be described by a particular pattern. Determining which retrieved records to place in the smaller dataset may then be based at least in part on ensuring that approximately 90% of the records in the smaller dataset are also described by that pattern. Alternatively, sampling may be done so as to ensure that each pattern identified in the larger dataset is approximately equally represented in the smaller dataset, regardless of the pattern distribution in the larger dataset. In some implementations, a user may specify the desired makeup of the smaller dataset, and sampling may be clone according to the user's specification. This decision may depend on the purpose for which the smaller dataset is being generated.

In some cases, a user-specified size of a smaller dataset may not be sufficient to hold enough records to represent every pattern represented in the larger dataset. In such cases, adding a new record to the smaller dataset corresponding to a unique pattern may require evicting a different record from the smaller dataset corresponding to a different unique pattern. Accordingly, sampling heuristics may be used in order to make the most efficient use of limited slots in the smaller dataset. Such heuristics may be based on user-specifications, a perceived value of the various identified patterns, and/or other factors. For example, a user may partially alleviate this problem by merging one or more related patterns into a single more general pattern, thereby reducing the amount of pattern diversity to be represented in the smaller dataset. A user may additionally or alternatively specify that one or more patterns are higher priority than other patterns, and should be more heavily represented.

Addition of a retrieved record to a smaller dataset is also shown in FIG. 5. Specifically, FIG. 5 shows addition of record 500 to a smaller dataset 506 that already includes a number of records 508. Record 500 is identified as corresponding to pattern 2, describing all records with the general format of "M/DD/YYYY". Pattern 2 has a representation status of 0, meaning there are currently no records in the smaller dataset that correspond to pattern 2. Accordingly, record 500 represents a relatively high-value record, and is added to the smaller dataset as record 508A1, after evicting a record that had previously occupied that slot.

As described above, a larger dataset may in some cases have multiple data columns, each of which holds one or more records. When sampling records from the larger dataset, it may be desirable not only to increase the number of unique patterns represented in the smaller dataset, but also increase representation of unique pattern combinations across two or more data columns in the smaller dataset. For example, a first data column may include records defining the first mailing address line of a business's customers. A second data column in the same dataset may include records defining the second mailing address line of the same customers. Records in each data column may have a variety of different formats described by a variety of different patterns. Accordingly, it may be desirable to ensure that not only is each different pattern represented in the smaller dataset, but the possible combinations of formats between the first and second mailing address columns are also represented. This may be taken into account when determining whether to place retrieved records in a smaller dataset. For example, a particular retrieved record corresponding to a first existing pattern may be deemed less valuable than a different record corresponding to a second existing pattern if the second existing pattern would form a unique combination pair. Generating a smaller dataset in this manner may make it easier to, for example, generate a program that outputs the contents of the dataset as mailing labels, by ensuring that the program is trained on every possible combination.

As another example, a larger dataset may have five total data columns, each holding a number of records. The records held in each column are described by five different patterns, meaning the records in the overall dataset are described by twenty five different patterns. The total number of unique pattern combinations between the five data columns would then be $5^5$, which may be significantly larger than the size of the smaller dataset. Accordingly, preference may be given to representing pattern combinations between, for example, two particular data columns in the dataset. In some implementations, these two data columns may be user-selected for increased pattern combination representation in the smaller dataset. As an example, a user may select the first mailing address line and the second mailing address line columns for increased representation, knowing that so long as the mailing address is correct, a package will still be delivered regardless of whether the recipient's name is correctly formatted.

Whether a retrieved record would add to pattern combination diversity can therefore also be a considered factor when assigning a value score to the retrieved record. For example, a retrieved record may be assigned both a pattern diversity score (i.e., a representation status of a least-represented pattern of that record), and a combination diversity score (i.e., to what extent will that pattern add to the representation of unique pattern combinations across two or more data columns). These two scores may be combined in order to calculate the overall value score for the retrieved record, with the pattern diversity score frequently being weighted more heavily than the combination diversity score. In the case that two or more data columns have been user-selected for particular representation in the smaller dataset, then a combination diversity score for a particular record may be relatively higher if that record improves the combination diversity for the user-selected columns. Because these scores are calculated for each retrieved record based on the records in the smaller dataset, then the extent to which a particular pattern combination impacts a score can dynamically change as the makeup of the smaller dataset changes. In other words, a user can select two data columns for particular combination representation. As the smaller dataset is filled, more and more pattern combinations between those two data columns may be added to the smaller dataset. Accordingly, as those pattern combinations become well represented, then their contribution to a value score calculated for a new retrieved record may be dynamically reduced, such that additional patterns and pattern combinations become more highly valued, provided that the user-selected pattern combinations are still well represented.

Figure 6:
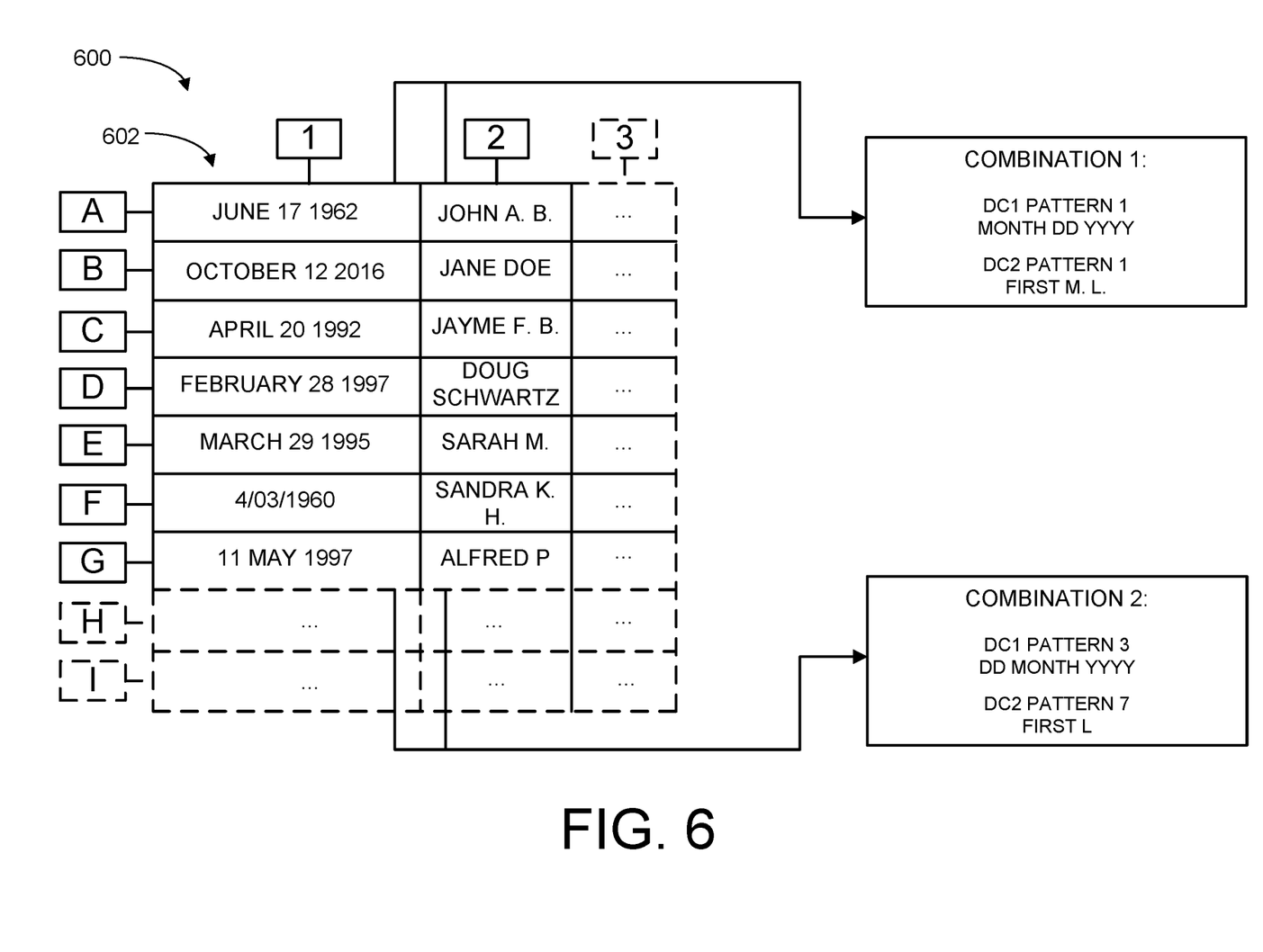
FIG. 6 schematically shows an example dataset including a plurality of data columns.

Sampling of a larger dataset based on pattern combinations is schematically illustrated in FIG. 6, which shows an example larger dataset 600 including a number of records 602. As shown, dataset 600 includes a set of records in column 1 as well as another set of records in column 2. Each set of records exhibits different formats that can be described by different patterns, and sampling of the records into a smaller dataset can be done so as to increase representation of unique pattern combinations across data columns in the smaller dataset.

As an example, dataset 600 includes a record 602A1 ("JUNE 17 1962") that is described by a first pattern of data column 1. Dataset 600 also includes a record 602B1 ("JOHN A. B.") that is described by a first pattern of data column 2. The combination of these two patterns is indicated by combination 1, shown in FIG. 6. FIG. 6 also shows a combination 2, showing the combination of patterns describing records 602G1 and 602G2. As described above, these combinations may be taken into account when retrieving records and determining whether to add them to the smaller dataset, so as to increase the number of unique pattern combinations represented in the smaller dataset.

As described above, a larger dataset may be stored on a computing system, and the processing required to profile and sample the larger dataset to generate the smaller dataset may be done by the same or a different computing system. In some implementations, the larger dataset may be distributed between storage machines associated with several different computing systems. In other words, each different computing system may hold a subset of the records of the larger dataset. In such implementations, the sampling described herein may be performed in a distributed manner, by first running the above-described sampling on each subdivision of the dataset, then combining smaller datasets generated for each subdivision to ultimately produce a single sample for the larger dataset.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
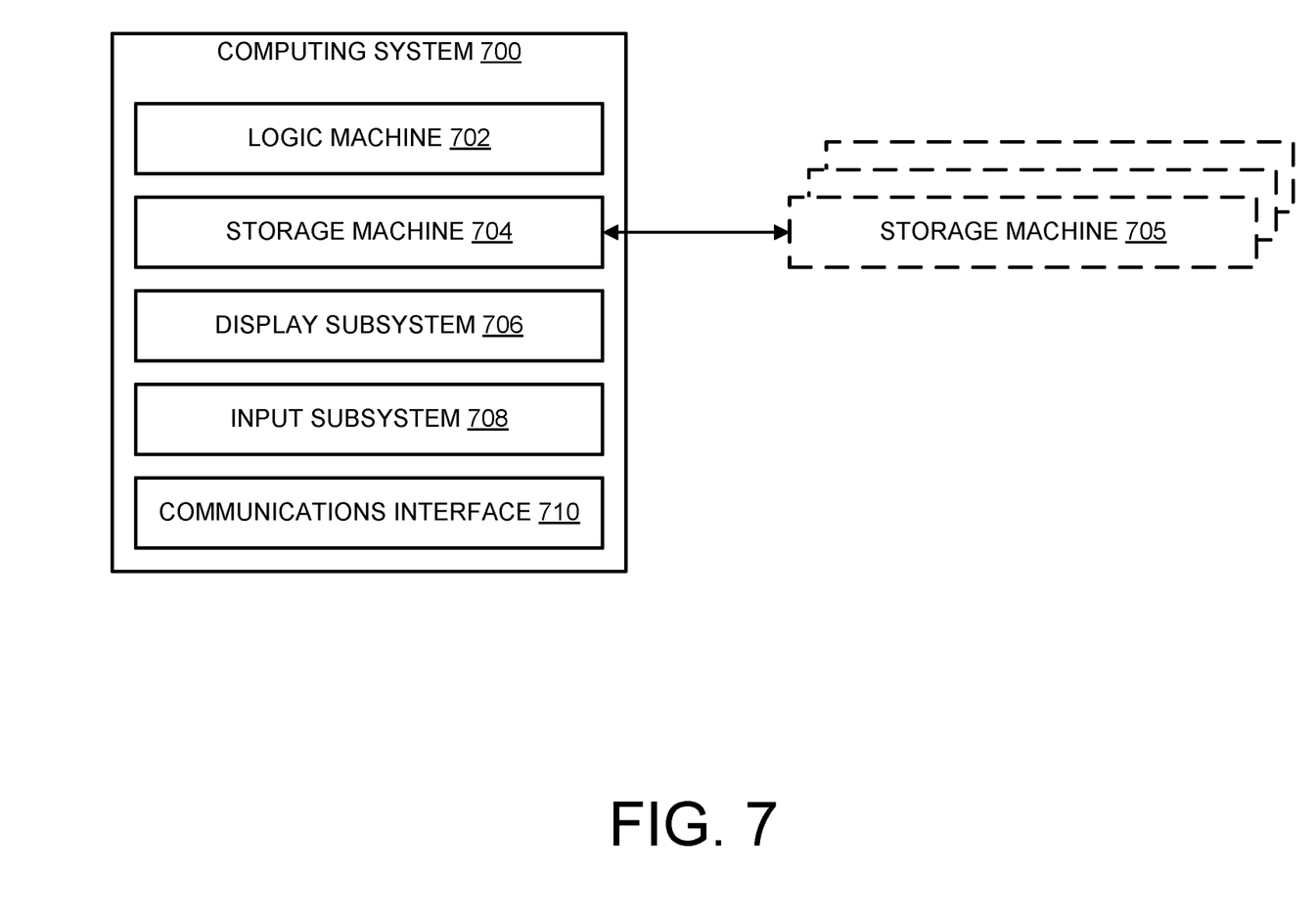
FIG. 7 schematically shows an example computing system.

FIG. 7 schematically shows a non-limiting embodiment of a computing system 700 that can enact one or more of the methods and processes described above. In particular, computing system 700 may be used to profile and sample a larger dataset in order to generate a smaller dataset, as described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include and/or be operatively coupled with one or more additional storage machines 705 (which may be, for example, storage machines associated with other computing systems), a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Computing system 700 may be operatively coupled with one or more additional storage machines 705, which may be substantially similar to storage machine 704 described above. Such additional storage machines may take the form of multiple rewritable storage media constituting a bulk storage array, such as a RAID array, for example. Additionally, or alternatively, computing system 700 may have access to storage machines 705 of other computing systems, accessible via computer networks, such as local intranet networks and/or the Internet. Accordingly, a larger dataset as described above may be distributed between multiple storage machines of multiple computing systems.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

In an example, a method for generating a smaller dataset from a larger dataset, each dataset holding a plurality of records, comprises: profiling the larger dataset to identify a plurality of patterns, each of which is descriptive of one or more records of the plurality of records held in the larger dataset; filling each of a plurality of slots of the smaller dataset with records held in the larger dataset; individually retrieving multiple records held in the larger dataset; and for each retrieved record, determining whether to (a) place the retrieved record into a slot of the smaller dataset and evict a record already occupying that slot; or (b) not place the retrieved record into the smaller dataset; where the above-cited determining is based on a pattern of the retrieved record and a representation status of the pattern in the smaller dataset. In this example or any other example, the multiple individually retrieved records include every record in the larger dataset. In this example or any other example, the method further comprises, subsequent to filling each of the plurality of slots of the smaller dataset, generating a pattern-based sample set having a plurality of pattern slots corresponding to the plurality of patterns identified in the larger dataset, each pattern slot corresponding to a different pattern of the plurality of patterns and filled with a record from the larger dataset corresponding to that pattern, and the multiple individually retrieved records are retrieved from the pattern-based sample set. In this example or any other example, each pattern of the plurality of patterns includes a count of a number of records in the larger dataset described by the pattern. In this example or any other example, each pattern of the plurality of patterns includes a recognition function for identifying records in the larger dataset described by the pattern. In this example or any other example, records held in the larger dataset and smaller dataset are alphanumeric strings. In this example or any other example, each pattern in the plurality of patterns describes a unique format exhibited by one or more records of the larger dataset. In this example or any other example, the above-cited determining is done so as to increase the number of unique patterns represented in the smaller dataset. In this example or any other example, the larger dataset includes a plurality of data columns, and the above-cited determining is done so as to increase representation of unique pattern combinations across two or more of the data columns in the smaller dataset. In this example or any other example, the two or more data columns are user-selected for increased unique pattern combination representation in the smaller dataset. In this example or any other example, based on a retrieved record being described by more than one pattern of the plurality of patterns, the above-cited determining is done according to a representation status of a least-represented pattern describing the retrieved record. In this example or any other example, records in the larger dataset are stored on storage machines of two or more computing systems.

In an example, a system for generating a smaller dataset from a larger dataset, each dataset holding a plurality of records, comprises: means for profiling the larger dataset to identify a plurality of patterns, where each of the plurality of patterns is descriptive of one or more records of the plurality of records held in the larger dataset; means for filling the smaller dataset with records held in the larger dataset, where the smaller dataset has a predetermined size in bytes; means for individually retrieving multiple records held in the larger dataset; and for each retrieved record, means for determining whether to (a) place the retrieved record into the smaller dataset and, if placing the retrieved record into the smaller dataset would exceed the predetermined size, evict a record already in the smaller dataset; or (b) not place the retrieved record into the smaller dataset; where the above-cited determining is based on a pattern of the retrieved record and a representation status of the pattern in the smaller dataset. In this example or any other example, the multiple individually retrieved records include every record in the larger dataset. In this example or any other example, each pattern of the plurality of patterns includes a count of a number of records in the larger dataset described by the pattern. In this example or any other example, each pattern of the plurality of patterns includes a recognition function for identifying records in the larger dataset described by the pattern. In this example or any other example, the above-cited determining is done so as to increase the number of unique patterns represented in the smaller dataset. In this example or any other example, the larger dataset includes a plurality of data columns, and the above-cited determining is done so as to increase representation of unique pattern combinations across two or more of the data columns in the smaller dataset. In this example or any other example, based on a retrieved record being described by more than one pattern of the plurality of patterns, the above-cited determining is done according to a representation status of a least-represented pattern describing the retrieved record.

In an example, a method for generating a smaller dataset from a larger dataset, each dataset holding a plurality of alphanumeric strings, comprises: profiling the larger dataset to identify a plurality of patterns, each of which is descriptive of one or more alphanumeric strings of the plurality of alphanumeric strings held in the larger dataset; filling each of a plurality of slots of the smaller dataset with alphanumeric strings held in the larger dataset; individually retrieving each alphanumeric string held in the larger dataset; and for each retrieved alphanumeric string, determining whether to (a) place the retrieved alphanumeric string into a slot of the smaller dataset and evict an alphanumeric string already occupying that slot; or (b) not place the retrieved alphanumeric string into the smaller dataset; where the above-cited determining is based on a pattern of the retrieved alphanumeric string and a representation status of the pattern in the smaller dataset, and the above-cited determining is done so as to increase a number of unique patterns represented in the smaller dataset.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for generating a smaller dataset from a larger dataset, each dataset holding a plurality of records, the method comprising:
profiling the larger dataset to identify a plurality of patterns, each of which is descriptive of one or more records of the plurality of records held in the larger dataset;
filling each of a plurality of slots of the smaller dataset with records held in the larger dataset;
individually retrieving multiple records held in the larger dataset; and
for each retrieved record, determining whether to (a) place the retrieved record into a slot of the smaller dataset and evict a record already occupying that slot; or (b) not place the retrieved record into the smaller dataset;
where such determining is based on a value score for the retrieved record as compared to value scores of each of the records occupying the plurality of slots of the smaller dataset, the value score for the retrieved record being determined based on pattern of the retrieved record and a representation status of the pattern in the smaller dataset.

2. The method of claim 1, where the multiple individually retrieved records include every record in the larger dataset.

3. The method of claim 1, further comprising, subsequent to filling each of the plurality of slots of the smaller dataset, generating a pattern-based sample set having a plurality of pattern slots corresponding to the plurality of patterns identified in the larger dataset, each pattern slot corresponding to a different pattern of the plurality of patterns and filled with a record from the larger dataset corresponding to that pattern, and where the multiple individually retrieved records are retrieved from the pattern-based sample set.

4. The method of claim 1, where each pattern of the plurality of patterns includes a count of a number of records in the larger dataset described by the pattern.

5. The method of claim 1, where each pattern of the plurality of patterns includes a recognition function for identifying records in the larger dataset described by the pattern.

6. The method of claim 1, where records held in the larger dataset and smaller dataset are alphanumeric strings.

7. The method of claim 1, where each pattern in the plurality of patterns describes a unique format exhibited by one or more records of the larger dataset.

8. The method of claim 1, where the determining is done so as to increase the number of unique patterns represented in the smaller dataset.

9. The method of claim 1, where the larger dataset includes a plurality of data columns, and the determining is done so as to increase representation of unique pattern combinations across two or more of the data columns in the smaller dataset.

10. The method of claim 9, where the two or more data columns are user-selected for increased unique pattern combination representation in the smaller dataset.

11. The method of claim 1, where based on a retrieved record being described by more than one pattern of the plurality of patterns, the determining is done according to a representation status of a least-represented pattern describing the retrieved record.

12. The method of claim 1, where records in the larger dataset are stored on storage machines of two or more computing systems.

13. A computing system for generating a smaller dataset from a larger dataset, each dataset holding a plurality of records, the computing system comprising:
  a logic machine; and
  a storage machine holding instructions executable by the logic machine to:
  profile the larger dataset to identify a plurality of patterns, where each of the plurality of patterns is descriptive of one or more records of the plurality of records held in the larger dataset;
  fill the smaller dataset with records held in the larger dataset, where the smaller dataset has a predetermined size in bytes;
  individually retrieve multiple records held in the larger dataset; and
  for each retrieved record, determine whether to (a) place the retrieved record into the smaller dataset and, if placing the retrieved record into the smaller dataset would exceed the predetermined size, evict a record already in the smaller dataset; or (b) not place the retrieved record into the smaller dataset;
  where such determining is based on a value score for the retrieved record as compared to value scores of each of the records occupying a plurality of slots of the smaller dataset, the value score for the retrieved record being determined based on a pattern of the retrieved record and a representation status of the pattern in the smaller dataset.

14. The computing system of claim 13, where the multiple individually retrieved records include every record in the larger dataset.

15. The computing system of claim 13, where each pattern of the plurality of patterns includes a count of a number of records in the larger dataset described by the pattern.

16. The computing system of claim 13, where each pattern of the plurality of patterns includes a recognition function for identifying records in the larger dataset described by the pattern.

17. The computing system of claim 13, where the determining is done so as to increase the number of unique patterns represented in the smaller dataset.

18. The computing system of claim 13, where the larger dataset includes a plurality of data columns, and the determining is done so as to increase representation of unique pattern combinations across two or more of the data columns in the smaller dataset.

19. The computing system of claim 13, where based on a retrieved record being described by more than one pattern of the plurality of patterns, the determining is done according to a representation status of a least-represented pattern describing the retrieved record.

20. A method for generating a smaller dataset from a larger dataset, each dataset holding a plurality of alphanumeric strings, the method comprising:
  profiling the larger dataset to identify a plurality of patterns, each of which is descriptive of one or more alphanumeric strings of the plurality of alphanumeric strings held in the larger dataset;
  filling each of a plurality of slots of the smaller dataset with alphanumeric strings held in the larger dataset;
  individually retrieving each alphanumeric string held in the larger dataset; and
  for each retrieved alphanumeric string, determining whether to (a) place the retrieved alphanumeric string into a slot of the smaller dataset and evict an alphanumeric string already occupying that slot; or (b) not place the retrieved alphanumeric string into the smaller dataset;
  where such determining is based on a value score for the retrieved alphanumeric string as compared to value scores of each of the alphanumeric strings occupying the plurality of slots of the smaller dataset, the value score for the retrieved alphanumeric string being determined based on a pattern of the retrieved alphanumeric string and a representation status of the pattern in the smaller dataset, and the above-cited determining is done so as to increase a number of unique patterns represented in the smaller dataset.

* * * * *